May 31, 1955

W. J. BOHNET 2,709,367

APPARATUS FOR TRANSMITTING RADIANT
HEAT FOR TEMPERATURE MEASUREMENT

Filed Feb. 8, 1954

INVENTOR
WILLIAM J. BOHNET
BY H.R. Johns
ATTORNEY

United States Patent Office 2,709,367
Patented May 31, 1955

2,709,367

APPARATUS FOR TRANSMITTING RADIANT HEAT FOR TEMPERATURE MEASUREMENT

William J. Bohnet, Niagara Falls, N. Y., assignor to Union Carbide and Carbon Corporation, a corporation of New York Application February 8, 1954, Serial No. 408,824

5 Claims. (Cl. 73—355)

This invention relates to a temperature measuring apparatus of the type in which heat energy is transmitted through a crystalline rod for actuating a heat responsive device such as a thermocouple, or thermopile, which in turn actuates a temperature indicator of some sort such as a pyrometer or its mechanical or electronic equivalent. An object of this invention is to provide a device of this sort capable of indicating a wider range of temperatures than has heretofore been possible. Another object is to provide a simple and accurate temperature measuring device of this class. A further object is to provide such a device that is adapted for measuring temperatures in locations inaccessible to be reached by a straight rod.

The use of a quartz rod through which heat energy is transferred through a furnace wall from within the furnace to a location outside of it for heating a thermocouple which in turn actuates a sensitive electric measuring instrument graduated to indicate temperature in the furnace, has been disclosed by Marcellus 1,894,109, January 10, 1933. Such a device has an upper limit of 1100° C. for temperature measurement due to the fact that although quartz has a melting temperature of about 1710° C., a devitrification of the rod occurs at temperatures above 1100° C. and the rod progressively recrystallizes at various temperature rises. Another objection to this proposal is the presence of a lower limit below which the Marcellus suggestion is not adapted to operate. Such lower limit is about 650° C. and is due to the fact that a quartz rod is opaque to the transmission of heat energy of infra red waves having a wave length longer than approximately 5 microns. In addition to its devitrification properties the quartz rod plasticizes well below its melting temperature thus losing its usefulness above about 1100° C. for that reason also. The multicrystalline structure of quartz diffuses and scatters the radiant heat being transferred, causing this transferred heat to be conveyed less efficiently, which is especially true where there is a bend in the rod.

According to this invention a clear sapphire rod has been used instead of a quartz rod with two conspicuous advantages. A higher range of temperatures can now be measured than was possible with the Marcellus suggestion because the sapphire rod has a higher melting temperature, about 2030° C. instead of 1710° C. for the quartz rod and does not recrystallize. Also a lower range of temperatures can be measured, namely from about 650° C. down to approximately room temperature. A quartz rod is opaque to radiations of wave lengths due to temperatures of about 650° C. and below. The monocrystalline structure of the sapphire rod is important in maintaining its substantially straight-line function of radiant heat transference. Due to the sapphire rod having a sharp melting point, it is capable of functioning efficiently up to approximately 2000° C., which is about 900° C. higher than the upper useful limit in temperature for the quartz rod.

Referring to the drawing, Fig. 1 shows one embodiment of this invention.

Fig. 2 shows a view corresponding to Fig. 1 except that the sapphire rod 14a does not project inwardly but is substantially flush with the inner surface of the lining 12a.

Figure 3:
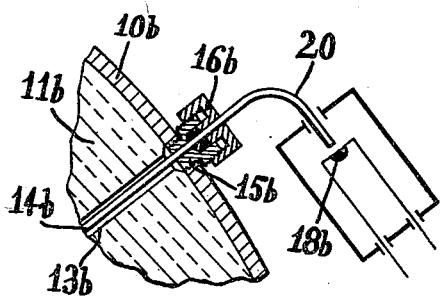
Fig. 3 is a view corresponding to Fig. 1 except that the sapphire rod is bent.

The outer shell 10 of the main body portion 11 of a furnace wall is provided on the inside with some suitable lining 12. A perforation 13 extends through the portion 11 and lining 12 in order that a sapphire rod 14 may project into the furnace. The outer shell 10 is threaded as illustrated for reception of a gland holding element 15 whereby the packing or gland serves to clamp the rod 14 and hold it in place. An outer nut 16 is provided for applying pressure to the packing for compressing the same in order to tightly grip the rod 14. The outer end 17 of the rod 14 is located adjacent some appropriate temperature responsive element such as a thermocouple 18 having its ends connected to an appropriate pyrometer 19 which may be graduated to read temperature within the furnace.

Figure 1:
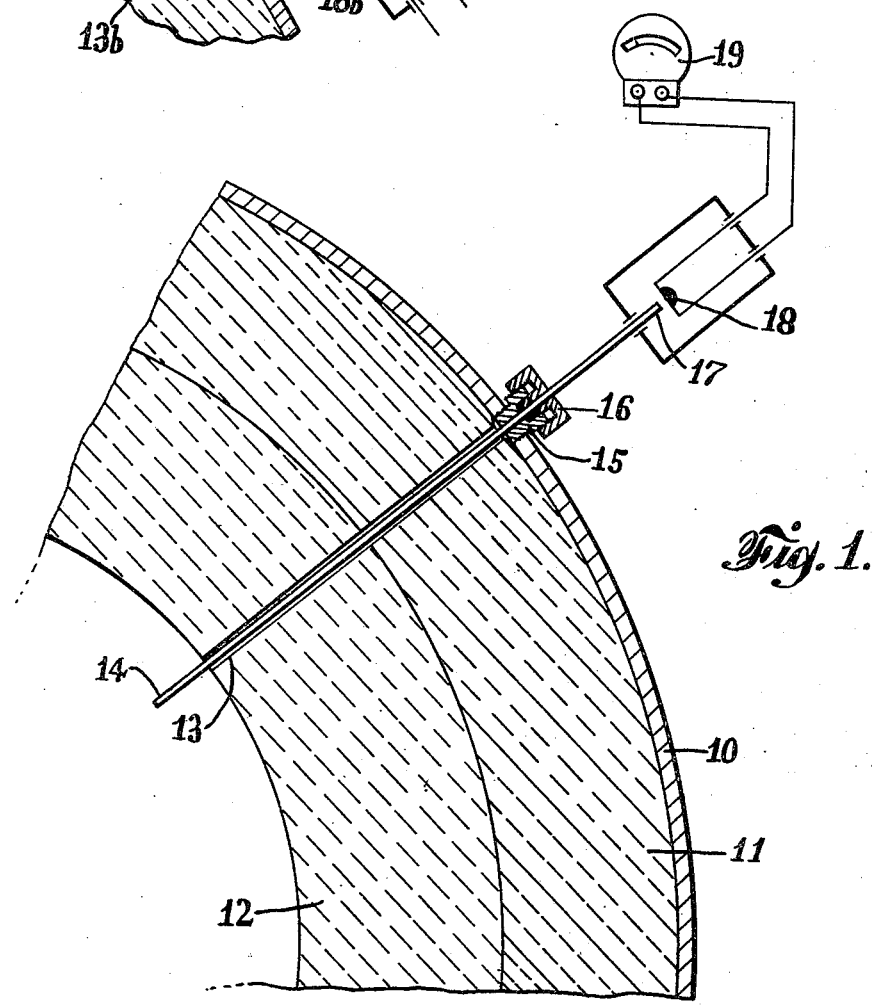
Figure 2:
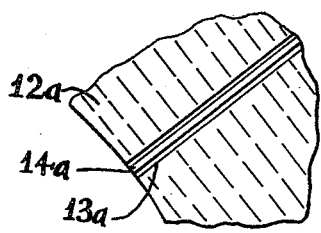

In Fig. 2 the sapphire rod 14a does not extend into the furnace as it does in Fig. 1 but terminates substantially flush with the inner surface of the lining 12a. Thus there is less danger of the rod being broken or bent by solid pieces of scrap or other material with which the furnace may be charged prior to the contents being melted down.

In Fig. 3 the sapphire rod 14b is provided with a bend 20 in order that the heat radiations supplied to the thermocouple 18b may be directed around the corner. The same numerals are used in Fig. 2 and Fig. 3 as are used in Fig. 1 with the exception that in Fig. 2 the numerals have exponent "a" and in Fig. 3 the numerals have the exponent "b."

Among other advantages of this invention may be mentioned the elimination of the need for a sight glass and optical system customarily used today in the focusing of radiant energy on a thermocouple or thermopile. This, therefore, eliminates the need for maintenance of these parts. Also eliminated is the need for a correction for loss in radiant energy in the glass window. Because temperature indication is due entirely to radiated energy and not conducted heat, the outer end surface of the rod remains at ambient temperature. There is, therefore, a difference in temperature, both radiant and conducted, between the hot and cold ends. This apparent loss in radiant energy through the rod simply follows the normal radiation laws that exist between the source and the receiver and remains proportional to any temperature of the hot end. In the case of conducted heat, the proportions of the rod and the thermal conductivity result in the temperature of the outer end of the rod remaining constant regardless of temperature of the hot end. Such rod may be sealed in place and thus render its use appropriate for lower or higher than atmospheric pressures in the furnace. Instead of projecting into the furnace as illustrated the hazard of breakage may be minimized if the end of the rod is brought substantially flush with the furnace lining. In some particular instances where the temperature of molten metal is desired but cannot be determined because of surface coverings, such as slag, it is possible to have the sapphire rod enter the furnace well below the liquid level and extend only to a position flush with inner surfaces of the furnace lining. In this way a more accurate temperature reading can be obtained since the end of the rod 14 is in contact with the molten metal and no correction is needed for the absorption of radiant energy by the slag and other material floating in the bath. Atmospheres of argon, helium, carbon monoxide and hydrogen have each been used in the furnace without their presence affecting the accuracy of reading. The sapphire rod is far safer than the use of a quartz rod because the sapphire rod is a much better conductor of infra red radiation and the sapphire rod may be bent easily without recrystallization. In this way the sapphire rod is adapted to extend into inaccessible locations. A rod 1/8 of an inch in diameter has been found suitable for all applications because of its low ratio of area to the length. However, other diameter sized rods may be employed but corrections must then be made for change in area to length ratio. Where the rod is bent, slightly lower reading is to be expected depending upon the radius of the bend.

I claim:

1. An apparatus for measuring temperature comprising a monocrystalline rod having a cool end and an opposite end adapted to extend into a furnace for reception and transmission therethrough of heat energy to a cool end from said opposite end of the rod, a radiant heat responsive device at a cool end of said rod adapted to be activated by heat transmitted through said rod, and a temperature responsive indicator connected to said device for indicating the temperature in said furnace, said rod being of sapphire whereby said apparatus is adapted for use with both higher and lower temperatures than those for which a quartz rod is capable of transmitting heat energy and is also adapted for use with intermediate temperatures for which a quartz rod is capable of transmitting heat energy through itself.

2. Apparatus according to claim 1 in which a hot end of said rod is substantially flush with an inner surface of a wall of said furnace.

3. Apparatus according to claim 1 in which said sapphire rod is at least about 1/8 of an inch in diameter and at least about 16 inches long.

4. Apparatus according to claim 1 in which said device includes at least one thermocouple and said temperature responsive indicator is a meter responsive to electromotive force generated by said thermocouple.

5. Apparatus according to claim 1 in which said rod has, intermediate its ends, a bend.

References Cited in the file of this patent

UNITED STATES PATENTS

| | | |
|---|---|---|
| 1,894,109 | Marcellus | Jan. 10, 1933 |
| 2,303,704 | Oseland | Dec. 1, 1942 |

FOREIGN PATENTS

| | | |
|---|---|---|
| 275,186 | Switzerland | May 15, 1951 |